(12) United States Patent
Tateyama

(10) Patent No.: US 6,345,571 B2
(45) Date of Patent: Feb. 12, 2002

(54) FRYER

(75) Inventor: Iwao Tateyama, Nagoya (JP)

(73) Assignee: Paloma Industries, Limited (JP)

( * ) Notice: Subject to any disclaimer, the term of this patent is extended or adjusted under 35 U.S.C. 154(b) by 0 days.

(21) Appl. No.: 09/885,309

(22) Filed: Jun. 20, 2001

(30) Foreign Application Priority Data

Jun. 21, 2000 (JP) ........................................ 2000-186784

(51) Int. Cl.⁷ ................................................. A47J 37/12
(52) U.S. Cl. ............................ 99/330; 99/337; 99/403; 126/391
(58) Field of Search .......................... 99/325–334, 337, 99/338, 403–410; 126/390–392, 378, 92 AC, 92 R; 210/167, DIG. 8; 219/492, 494, 497, 506, 508, 442, 486, 510, 512; 340/589; 426/231–233, 438, 519, 808; 431/326, 170, 1; 700/90, 99, 85, 300

(56) References Cited

U.S. PATENT DOCUMENTS

| 4,228,730 A | * | 10/1980 | Schindler et al. | ............ 99/407 |
| 4,372,980 A | * | 2/1983 | Luebke et al. | ............ 426/231 |
| 4,437,159 A | | 3/1984 | Waugh | |
| 4,639,213 A | * | 1/1987 | Simpson | ............ 431/326 |
| 4,660,542 A | * | 4/1987 | Scherer | ............ 99/403 |
| 4,663,710 A | | 5/1987 | Waugh et al. | |
| 4,672,540 A | | 6/1987 | Waugh et al. | |
| 4,684,412 A | * | 8/1987 | Fritzsche | ............ 99/330 X |
| 4,848,318 A | * | 7/1989 | Brewer | ............ 126/390 |
| 4,858,119 A | | 8/1989 | Waugh et al. | |
| 4,913,041 A | * | 4/1990 | Taber et al. | ............ 126/391 |
| 5,038,753 A | * | 8/1991 | Yokoyama et al. | ....... 99/403 X |
| 5,185,168 A | * | 2/1993 | Takahashi | ............ 426/438 X |
| 5,261,322 A | * | 11/1993 | Yokoyama et al. | ....... 99/403 X |
| 5,417,202 A | * | 5/1995 | Cote | ............ 99/403 X |
| 5,490,449 A | * | 2/1996 | Meister et al. | ............ 99/403 |
| 5,706,717 A | * | 1/1998 | Barner | ............ 99/330 |

* cited by examiner

*Primary Examiner*—Timothy F. Simone
(74) *Attorney, Agent, or Firm*—Pearson & Pearson, LLP

(57) ABSTRACT

A fryer having an overheat protecting means for carrying out an operation test properly, thus improving the utility of the fryer. When it is determined that a high limit test is being performed a burner controller examines whether or not the temperature measured by a thermistor exceeds a preset level for the test determined by a fryer controller. If not, the combustion is continued and the burner controller repeats the test for overheating protection. When the temperature exceeds the preset level the burner controller tries to keep the temperature between the preset level and the preset level plus alpha. This is followed by turning off a high limitswitch and notifying the fryer controller for displaying a high limit abnormality.

1 Claim, 2 Drawing Sheets

Ill# FRYER

BACKGROUND OF THE INVENTION

1. Field of the Invention

The present invention relates to a fryer for heating up an oil vessel with a heating means to carry out fry cooking.

2. Description of the Related Art

A fryer comprises an oil vessel, a heating means such as a pulse burner for heating up cooking oil (referred to as oil hereinafter) filled in the oil vessel, and a first temperature sensing means such as a thermistor for sensing the temperature of the oil in the oil vessel. The fryer also includes a first controller provided as acting as a temperature setting means for setting the temperature and the cooking time for each menu and equipped with a control panel for controlling and displaying the setting temperature, the menus, and so on, and a second controller arranged responsive to a measurement of the temperature received from the first temperature sensing means for controlling the combustion of the heating means to maintain the oil temperature to the preset setting temperature determined by the first controller.

Moreover, the fryer has a second temperature sensing means such as a bimetal thermostat for preventing continuation of the combustion in case the first temperature sensing means is out of order and its measurement is lower than the actual temperature, and an overheat protecting means for canceling the combustion of the burner when overheating is detected. Thus, the fryer also has an operation test function for examining whether the overheat protecting means properly operates or not. More specifically, when a high limitswitch provided in the control panel of the first controller is turned on, it examines whether or not the pulse burner starts and continues the combustion until the thermostat is switched on and stops the combustion at a predetermined temperature when the thermostat is switched off.

Because the plural controllers communicate with each other with a serial link system, not a parallel link system, which decreases the number of the transmission lines, the overall structure can be simplified. However, using the serial link system may cause the setting temperature to exceed a normally acceptable level because of a wrong setting of the temperature at the control panel of the first controller by an operator. For compensation, an abnormal stopping means can be provided which can cancel the combustion of the pulse burner when the thermistor detects that the temperature exceeds a normally acceptable level. This safety function, however, keeps the pulse burner from continuing the combustion when the operation test for the overheat protecting means is ordered, thereby preventing the operation test for the overheat protecting means from being performed properly.

SUMMARY OF THE INVENTION

It is thus an object of the present invention, as defined in claim 1, to provide a fryer which can properly carry out an operation test for the overheat protecting means with a safety function provided for canceling the combustion when the setting temperature exceeds a normally acceptable level, hence improving its utility.

For achievement of the object, the fryer defined in claim 1 of the present invention is modified having an abnormal stopping means for canceling the action of the heating means, regardless of the setting temperature, when the temperature of the oil measured by the first temperature sensing means reaches a specified first upper limit, an overheat protecting means for canceling the action of the heating means when the temperature of the oil measured by the second temperature sensing means reaches a second upper limit which is higher than the first upper limit, and an operation testing means for continuously actuating the heating means to carry out an operation test for the overheat protectingmeans, wherein the action of the abnormal stopping means can be prohibited while the operation testing means is actuated.

DETAILED DESCRIPTION OF THE PREFERRED EMBODIMENTS

One embodiment of the present invention will be described referring to the relevant drawings.

Figure 1:
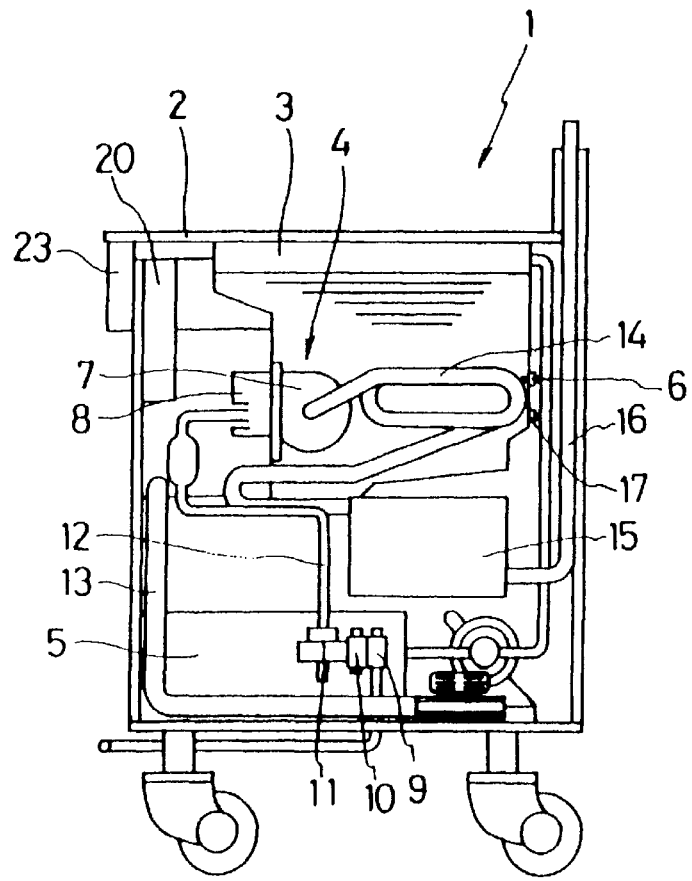
FIG. 1 is an overall illustrative view of a fryer.

FIG. 1 is an overall illustrative view of a fryer 1. The fryer 1 comprises a pair of left and right oil vessels 3,3 filled with cooking oil for frying foods (as will be described for one of the two vessels illustrated in FIG. 1), a pulse burner 4 provided as a heating means in the oil vessel 3 for heating up the oil, and an oil reservoir 5 for temporarily holding the oil to be filtered, and a casing 2 in which all these elements are installed. The oil vessel 3 is also equipped with a thermistor 6 provided as a first temperature measuring means for measuring the temperature of the oil.

The pulse burner 4 has a combustion chamber 7 located in the oil vessel 3 and a mixing chamber 8 located at the outside of the oil vessel 3 and communicated with the combustion chamber 7. The mixing chamber 8 is connected to a gas conduit 12 for feeding a flow of fuel gas provided with, from the upstream side, an intake electromagnetic valve 9, a main electromagnetic valve 10, and a gas governor 11. The mixing chamber 8 is also connected to an air supply conduit 13 provided with a blower for supply of fresh combustion air.

The combustion chamber 7 is also communicated with a tail pipe 14 extending through the oil vessel 3. The tail pipe 14 is connected via a decoupler 15 at the outside of the oil vessel 3 to an outwardly opening exhaust pipe 16. Denoted by 17 is a high limitswitch which is a bimetal type thermostat serving as a second temperature sensing means and mounted on an outer side of the oil vessel 3 for measuring the surface temperature of the oil vessel 3 to be turned on and off.

Figure 2:
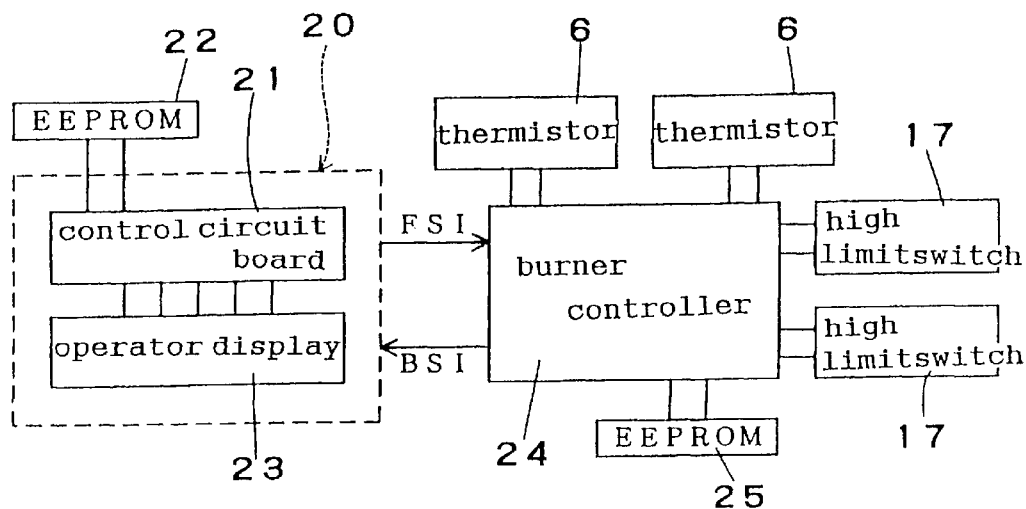
FIG. 2 is a schematic block diagram of a control unit of the fryer.

FIG. 2 is a schematic block diagram of a control unit of the fryer 1. Denoted by 20 is a first controller (referred to as a fryer controller hereinafter) which acts as the temperature setting means and comprises a controller circuit board 21 including a known set of a CPU (central processing unit), ROMs, and interfaces for exchange of data. The controller circuit board 21 is connected on its input side to an EEPROM 22 for storage of various controlling data. The fryer controller 20 also includes a control panel 23 exposed at the front of the casing 2 for determining and setting the cooking menus and the cooking temperature by performing the given operation of switches as well as displaying a selected menu and a setting temperature.

Denoted by 24 is a second controller (referred to as a burner controller hereinafter) which, like the fryer controller 20, includes a CPU and ROMs and is connected to an EEPROM 25. The burner controller 24 is also connected on its input side to the thermistors 6,6 and the high limitswitches 17,17 located in the paired oil vessels 3,3 respectively.

Figure 3:
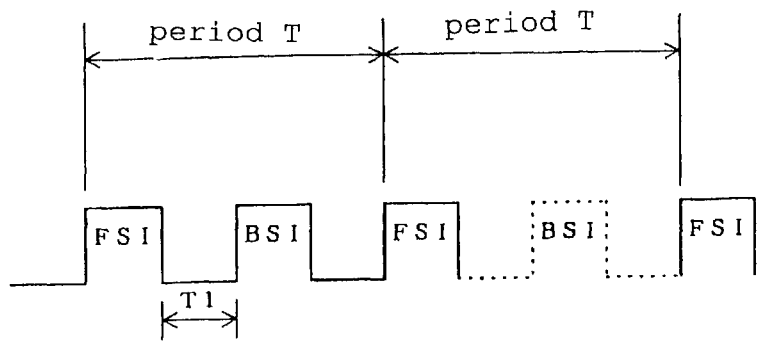
FIG. 3 is a time chart showing a communication action between a fryer controller and a burner controller.

The fryer controller 20 and the burner controller 24 are communicated to each other by a serial link system which exchanges serial data in a polling control manner. More specifically, the fryer controller 20 transmits a fryer controller setting data (referred to as FSI hereinafter) including the turning on and off of the frying action, the setting temperature, and the switching on and off of each high limitswitch at the start of a polling period T to demand the burner controller 24 for a response, as shown in FIG. 3. In response to the demand from the fryer controller 20, the burner controller 24 transmits a burner controller operating data (referred to as BSI hereinafter) including the measurements of the thermistors 6,6 and an abnormal detection code after a given period T1 from the end of FSI. The fryer controller 20 continues transmission of FSI at equal intervals of T regardless of the reception of BSI from the burner controller 24. The burner controller 24 can transmit BSI only when receiving the demand from the fryer controller 20.

In the fryer 1, when the start switch on the control panel 23 of the fryer controller 20 is depressed, FSI is transmitted and received by the burner controller 24 which in turn drives the pulse burner 4 to heat up the oil vessels 3. In response to a temperature measurement signal from the thermistor 6, the burner controller 24 carries out the opening and closing actions of the main electromagnetic valve 10 to turn on and off the burning action for maintaining the temperature of the oil in the oil vessel 3 to a setting level (normally, 93 to 182° C.) determined by the fryer controller 20.

Figure 4:
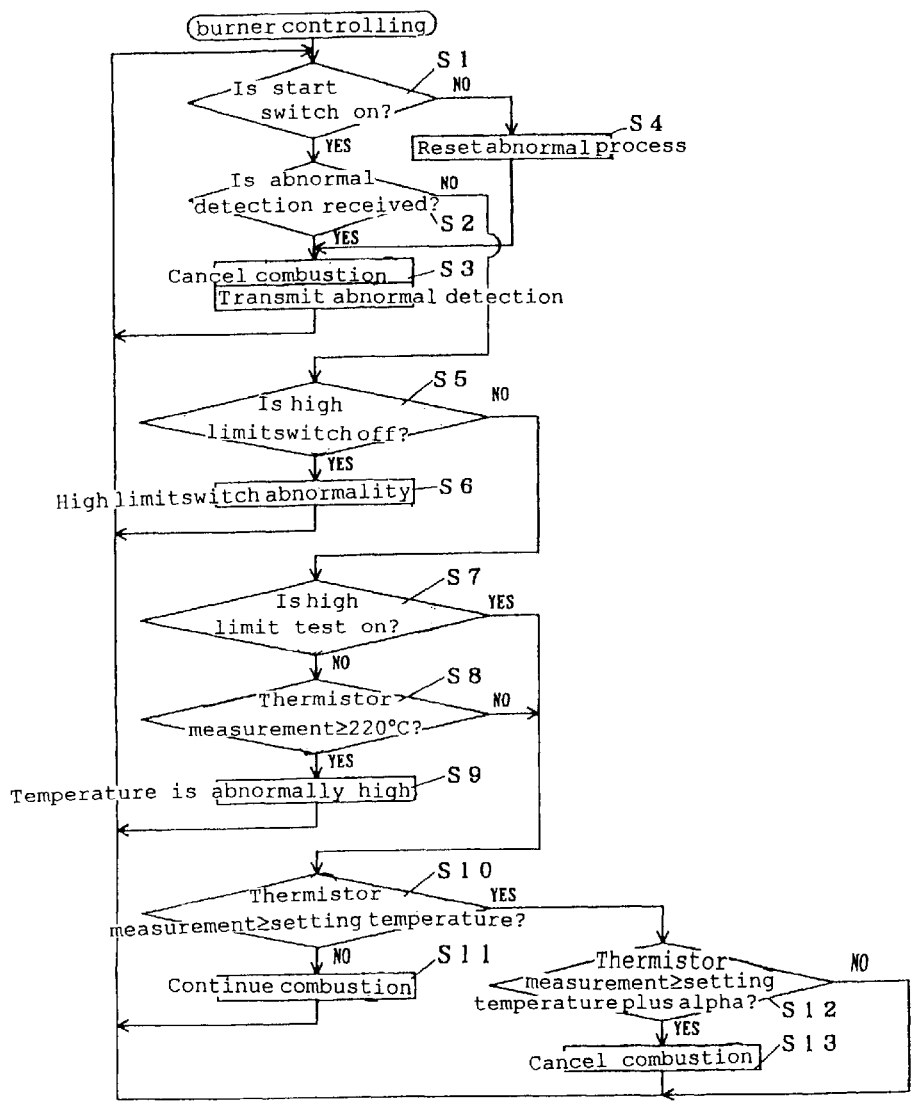
FIG. 4 is a flowchart of a controlling action of the burner controller.

The burner controller 24 has, in addition to the above described heat-up controlling function, an abnormal stop controlling function where the combustion of the pulse burner 4 is canceled when the temperature exceeds a first higher limit higher than the setting level, an overheat protection controlling function where overheating, caused by the pulse burner 4 continuing its combustion because the thermistor 6 is out of order and detects a lower temperature than the actual temperature, is detected by the high limitswitch 17, and an operation test controlling function (referred to as a high limit test hereinafter) whereby, the test examines whether the overheat protection controlling function is properly operated or not. Those controlling functions will now be explained referring to the flowchart of FIG. 4. As the two, left and right, oil vessels 3,3 are identical in the controlling manner, one of them will only be explained.

As the start switch on the control panel 23 of the fryer controller 20 is switched on, its switch-on signal is received at S1. Then, it is examined at S2 whether or not any abnormal temperature measurement derived from S6 or S9 described later is detected by the thermistor 6. If an abnormal temperature is not detected, the procedure goes to Step S5. When an abnormal temperature is detected, the combustion of the pulse burner 4 is canceled at S3 and simultaneously, an abnormal detection code is transmitted to the fryer controller 20. When the switch on signal is not received at SI, the abnormal detection code is reset at S4 and the combustion is canceled at S3.

This is followed by S5 where it is examined whether the high limitswitch 17 is turned off or not. When so, the procedure advances to S6 where it is determined that the high limitswitch 17 detects an abnormality and the temperature is at an overheated level and then the procedure returns to S1. As the abnormality is detected at S2, the procedure goes to S3 where the combustion is canceled and the abnormal detection code is transmitted. When it is judged at S5 that the high limitswitch 17 is turned on, the procedure advances to S7 where it is examined whether or not the high limit test is called for, i.e. the order for the high limit test is transmitted from the fryer controller 20. When not, it is examined at S8 whether the temperature of the oil measured by the thermistor 6 reaches the first upper limit level of 220° C. or not. When so, it is determined at S9 that the temperature is at an excessively higher level and the procedure returns to S1. This is followed by turning off the combustion and the abnormal detection code is transmitted at S3.

When it is judged at S7 that the high limit test is called for, the procedure jumps to S10 where it is examined whether or not the temperature measured by the thermistor 6 exceeds a setting level of 240° C. which has automatically been determined by the fryer controller 20. When not, the procedure goes to S11 for continuing the combustion before the steps are repeated from S1. Then, the procedure moves to S12 where it is examined whether or not the temperature exceeds the preset degree plus alpha (for example, the preset level plus two degrees). When so, the procedure goes to S13 for canceling the combustion and returns to S1. The plus alpha is a range for avoiding the turning on and off of the combustion from being repeated frequently. Normal, the temperature of the oil in the oil vessel 3 is controlled to stay within the range from the preset level to the preset level plus alpha. When the temperature rises up to a second upper limit (230 to 240° C.), the high limitswitch 17 is turned off as described at S5. When it is judged at S6 that the abnormal detection is transmitted, the combustion is canceled at S3. At the same time, the abnormal detection is displayed on the fryer controller 20.

When the preset temperature is determined greater than the second upper limit, the high limitswitch 17 is turned off and the abnormal setting code is transferred to the fryer controller 20 to cancel the combustion as described at S5 and S6.

According to the foregoing embodiment, not during the high limit test, when the temperature measured by the thermistor exceeds the first upper limit of 220° C. at S8, the abnormal detection is systematically transmitted for canceling the combustion regardless of the preset temperature determined by the fryer controller 20. This allows the pulse burner 4 to stop its combustion securely and safely even if the preset temperature is set to a wrong level due to an operating mistake of the fryer controller 20

Also, during the high limit test, when the thermistor measurement exceeds the first upper limit (220° C.), abnormal detection is not performed at S10, and the combustion is continued until the detected temperature reaches the second upper limit (230 to 240° C.) at which the high limitswitch 17 is activated. As a result, the high limit test can be carried out properly hence contributing to the improved utility of the fryer 1.

While the fryer with the plural oil vessels 3 is described in this embodiment, a fryer with a single oil vessel can be employed to the present invention. The setting temperature is not limited to the first upper limit or the second upper limit in the embodiment but may fittingly be determined depending on the type of the fryer.

As defined in claim 1 of the present invention, when the temperature measured by the first temperature sensing means reaches the first upper limit and the operation test for the overheat protecting means is not ordered, the abnormal stopping means receives a signal of the abnormal detection regardless of the preset temperature determined by the temperature setting means and stops the combustion of the heating means. Accordingly, even if the preset temperature is set by wrong operation or the like, the heating means can be canceled securely and safely.

Also, when the temperature measured by the first temperature sensing means reaches the first upper limit and the operation test for the overheat protecting means is ordered, the action of the abnormal stopping means is prohibited and the combustion of the heating means can be continued before the temperature measured by the second temperature sensing means reaches the second upper limit. As a result, the operation test for the overheat protecting means can be carried out properly, thus improving the utility of the fryer.

What is claimed is:

1. A fryer having an oil vessel, a first temperature sensing means for measuring the temperature of oil in the oil vessel, a temperature setting means for setting the temperature of the oil to a preset level, a heating means for heating up the oil vessel to the preset level determined by the temperature setting means while monitoring the temperature of the oil measured by said first temperature sensing means, and a second temperature sensing means for measuring the temperature of the oil heated by the heating means, said fryer comprising:

an abnormal stopping means for canceling the action of the heating means, regardless of the setting temperature, when the temperature of the oil measured by the first temperature sensing means reaches a specified first upper limit;

an overheat protecting means for canceling the action of the heating means when the temperature of the oil measured by the second temperature sensing means reaches a second upper limit which is higher than the first upper limit; and an operation testing means for continuously actuating the heating means and carrying out an operation test for the overheat protecting means, wherein the action of the abnormal stopping means can be prohibited while the operation testing means is actuated.

* * * * *